Feb. 1, 1966     S. W. LYSZCZEK     3,232,440
SLAT FOR GLASS RACK
Filed Sept. 3, 1963
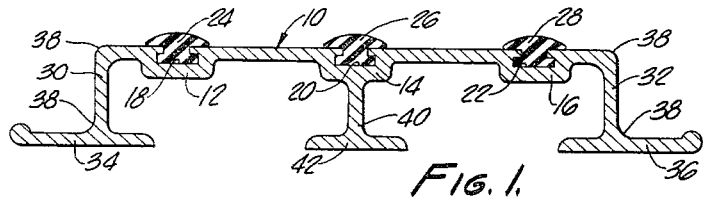
FIG. 1.
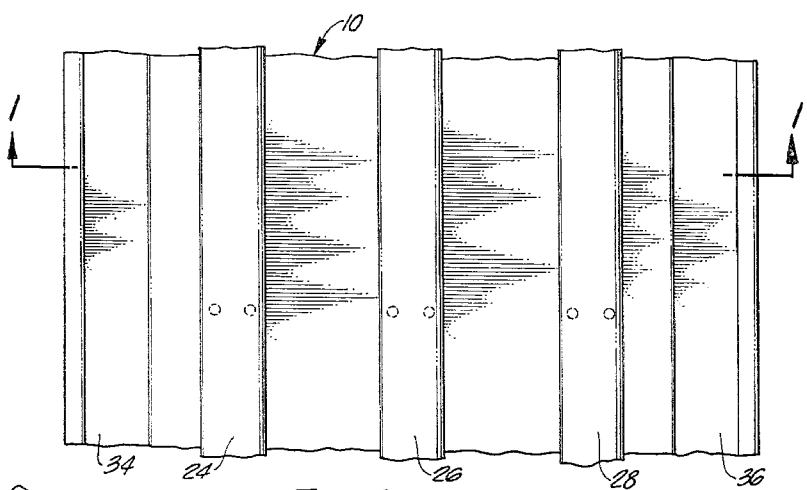
FIG. 2.
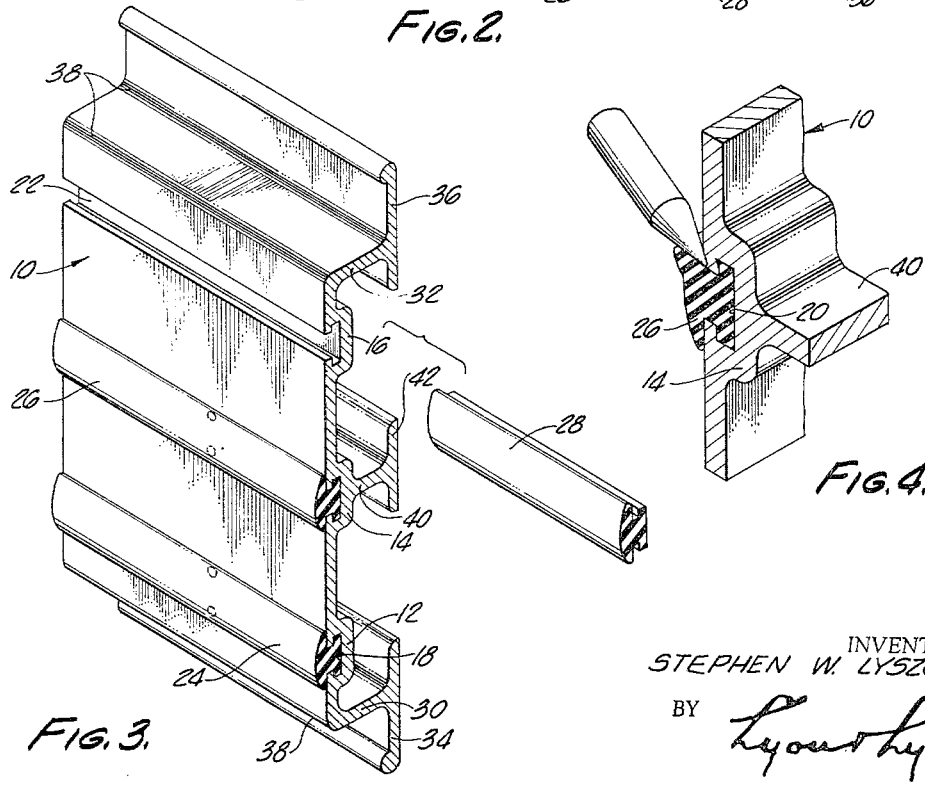
FIG. 3.
FIG. 4.
INVENTOR.
STEPHEN W. LYSZCZEK
BY
ATTORNEYS

United States Patent Office 3,232,440
Patented Feb. 1, 1966

3,232,440
SLAT FOR GLASS RACK
Stephen W. Lyszczek, 5348 Vineland Ave.,
North Hollywood, Calif.
Filed Sept. 3, 1963, Ser. No. 306,168
3 Claims. (Cl. 211—41)

This invention relates to a glass rack and more particularly relates to an improved glass supporting member for use in a glass rack.

My Patent No. 2,739,747, issued March 27, 1956, and entitled Glass Rack, discloses a truck mounted rack for supporting panes of plate glass. In this patent a plurality of slats are mounted on a framework, the slats being provided with strips of resilient material against which the glass rests. The present invention provides an improved glass supporting member or slat of this nature which is stronger and more durable than those heretofore used.

The glass supporting member of the present invention is formed by extruding aluminum in an improved slat shape and by inserting suitable shock-absorbing strips into the slat to make actual contact with the glass being supported. The aluminum structure is not subject to warpage and deforming from aging or weathering and is stronger and more stable than the structures heretofore used. The aluminum slats with shock-absorbing inserts prevent heat breakage of glass as has previously occurred when wood slats covered with heat absorbing materials were used.

It is therefore an object of the present invention to provide a member for supporting panes of plate glass and preventing their being scratched or broken.

It is also an object of the present invention to provide such a member which is extremely strong and sturdy and which can withstand rough use.

It is another object of the present invention to provide such a member which is formed of extruded aluminum, and which has shock-absorbing glass supporting strips inserted therein.

These and other objects aand advantages of the present invention will become more apparent upon reference to the accompany drawings and description in which:

FIGURE 1 is a sectional view taken along lines 1—1 of FIGURE 2.

FIGURE 2 is a top plan view of the glass supporting member or slat of the present invention.

FIGURE 3 is a perspective view of the member of the present invention showing one of the resilient strips removed therefrom; and FIGURE 4 shows the member being center punched to maintain the resilient strip in position.

Referring now to the several figures, the member or slat of the present invention is formed by extruding aluminum and has a flat upper plate 10 having a plurality of thickened longitudinal strips 12, 14 and 16. The thickened strips are provided with dovetailed slots 18, 20 and 22 respectively. These slots are adapted to receive and hold dovetailed strips of shock-absorbing resilient material 24, 26 and 28. Each of the strips 24, 26 and 28 is provided with an enlarged outer surface which projects a substantial distance above the surface of the plate 10. These strips 24, 26 and 28 act to support panes of glass and protect them from scratching or other injury.

A pair of end flanges or legs 30 and 32 depend from the top plate 10. The leg 30 is provided with a base plate 34 which is generally parallel to the top plate 10 and the leg 32 is provided with a similar base plate 36. In order to provide increased strength, the areas of connection of the legs 30 and 32 to the top plate 10 and base plate 34 and 36 are rounded as shown at 38, the radii of curvature being such that the material in these areas is thicker than the material of either the plates or the legs.

A third leg 40 is provided descending from the central thickened strip 14 and is provided with a base plate 42. This leg serves to strengthen the central portion of the member or slat and prevents a force exerted on this central area from causing the top plate 10 to fold inwardly around its center line.

The member just described is preferably formed by extruding aluminum in the proper shape. The resilient strips 24, 26 and 28 are then slid into the slots 18, 20 and 22 respectively. In order to prevent the strips 24, 26 and 28 from sliding out of the slots, the thickened strips 12, 14 and 16 are preferably center punched about one inch from each end by means of a suitable punch as shown in FIGURE 4. The punched impressions are also shown in FIGURE 3.

While what hereinbefore has been described is the preferred embodiment of this invention, it is readily apparent that alterations and modifications can be resorted to without departing from the scope of this invention and the following claims.

I claim:

1. A slat for supporting panes of glass or the like comprising the combination of a one piece, extruded metal structure having a top plate provided with a plurality of longitudinal portions of thickened cross-section, each of said portions having a dovetailed slot therein adapted to receive and hold similarly dovetailed strips of resilient material, a leg depending from either side of said top plate, the area of connection between said top plate and said depending legs having a radii of curvature such that the material in said area is thicker than the material of either the top plate or said legs, the side of said legs being substantially perpendicular to the said top plate, each of said legs being provided with a broad foot, the area of connection between said broad feet and said depending legs having a radii of curvature such that the material in said area is thicker than the material of either the broad feet or said legs, and a third leg connected to and descending from one of said longitudinal portions of thickened cross-section, said third leg being provided with a broad foot lying in the same plane as the broad feet connected to said first and second legs; and a plurality of dovetailed strips of resilient material, one of said strips being received and held in each of said dovetailed slots within said thickened longitudinal portions, a portion of each of said strips extending above the surface of said top plate and the exposed surface of said strips when held in said slots being non-abrasive.

2. The apparatus of claim 1 wherein said slat is formed of extruded aluminum.

3. A slat for supporting panes of glass or the like comprising an extruded, one piece aluminum structure having a top plate provided with a plurality of longitudinal portions of thickened cross-section, each of said portions having a dovetailed slot therein adapted to receive and hold similarly dovetailed strips of resilient material, a leg depending from each side of said top plate, the area of connection between said top plate and said depending legs having a radii of curvature such that the material in said area is thicker than the material of either the top plate or said legs, the side of said legs being substantially perpendicular to the said top plate, each of said legs being provided with a broad foot, the area of connection between said broad feet and said depending legs having a radii of curvature such that the material in said area is thicker than the material of either the broad feet or said legs, and a third leg connected to and descending from one of said longitudinal portions of thickened cross-section, said third leg being provided with a broad foot lying in the same plane as the broad feet connected to said first and second legs; and a plurality of dovetailed strips of resilient material, one of said strips being received and held in each of said dovetailed slots within said thickened longitudinal portions, a portion of each of said strips extending above the surface of said top plate and the exposed surface of said strips when held in said slots being non-abrasive; said thickened longitudinal portions being center-punched at each end thereof to maintain the resilient non-abrasive strips within the slots.

References Cited by the Examiner

UNITED STATES PATENTS

| 1,936,113 | 11/1933 | Jellife | 248—188.8 |
| 2,181,812 | 11/1939 | Kammerer | 20—64 |
| 2,739,747 | 3/1956 | Lyszczek | 224—42.11 |
| 3,023,834 | 3/1962 | Buchanan | 182—223 |

FOREIGN PATENTS

| 677,559 | 8/1952 | Great Britain. |

CLAUDE A. LE ROY, *Primary Examiner.*